(12) United States Patent
Hofmann et al.

(10) Patent No.: US 10,775,134 B2
(45) Date of Patent: Sep. 15, 2020

(54) TELESCOPIC SIGHT HAVING FAST RETICLE ADJUSTMENT

(71) Applicant: STEINER-OPTIK GmbH, Bayreuth (DE)

(72) Inventors: Matthias Hofmann, Bayreuth (DE); Tobias Eberhardt, Fichtelberg (DE)

(73) Assignee: STEINER-OPTIK GmbH, Bayreuth (DE)

( * ) Notice: Subject to any disclaimer, the term of this patent is extended or adjusted under 35 U.S.C. 154(b) by 0 days.

(21) Appl. No.: 16/113,563

(22) Filed: Aug. 27, 2018

(65) Prior Publication Data

US 2018/0364005 A1    Dec. 20, 2018

Related U.S. Application Data

(63) Continuation of application No. 14/904,389, filed as application No. PCT/DE2014/000359 on Jul. 15, 2014, now Pat. No. 10,072,907.

(30) Foreign Application Priority Data

Jul. 24, 2013 (DE) .......................... 10 2013 012 257

(51) Int. Cl.
| | |
|---|---|
| *F41G 1/38* | (2006.01) |
| *F41G 3/06* | (2006.01) |
| *G02B 23/00* | (2006.01) |
| *G02B 23/16* | (2006.01) |
| *F41G 3/02* | (2006.01) |
| *G02B 23/14* | (2006.01) |

(Continued)

(52) U.S. Cl.
CPC ................. *F41G 1/38* (2013.01); *F41G 3/02* (2013.01); *F41G 3/06* (2013.01); *G02B 23/00* (2013.01); *G02B 23/14* (2013.01); *G02B 23/16* (2013.01); *G02B 27/36* (2013.01); *G09G 3/3208* (2013.01); *F41G 1/473* (2013.01); *F41G 1/54* (2013.01); *F41G 1/545* (2013.01); *F41G 11/00* (2013.01)

(58) Field of Classification Search
CPC ... F41G 1/38; F41G 3/06; F41G 1/473; F41G 3/08; F41G 11/00
See application file for complete search history.

(56) References Cited

U.S. PATENT DOCUMENTS

| | | | |
|---|---|---|---|
| 4,248,496 A | 2/1981 | Akin, Jr. et al. | |
| 4,494,198 A * | 1/1985 | Smith | F41G 3/00 89/132 |

(Continued)

FOREIGN PATENT DOCUMENTS

| | | |
|---|---|---|
| DE | 4218118 A1 | 12/1993 |
| DE | 202005015731 U1 | 1/2006 |

(Continued)

*Primary Examiner* — Christopher Stanford
(74) *Attorney, Agent, or Firm* — Rimon, P.C.

(57) ABSTRACT

The invention relates to a long-range optical device, in particular a telescopic sight 1, with at least one objective lens 2 and at least one eyepiece 3 and with an adjustable reticle 6 arranged between the objective lens 2 and the eyepiece, wherein the reticle 6 is coupled to a manually operable fast reticle adjustment, wherein a display device 14 is arranged in the field of view of the long-range optical device 1, through which a distance value set by a setting device 4, 15 of the fast reticle adjustment can be read when using the long-range optical device 1.

17 Claims, 5 Drawing Sheets

(51) Int. Cl.
　　*G02B 27/36*　　(2006.01)
　　*G09G 3/3208*　　(2016.01)
　　*F41G 1/54*　　(2006.01)
　　*F41G 11/00*　　(2006.01)
　　*F41G 1/473*　　(2006.01)

(56) References Cited

U.S. PATENT DOCUMENTS

| | | | |
|---|---|---|---|
| 4,561,204 A | 12/1985 | Binion | |
| 4,965,439 A * | 10/1990 | Moore | F41G 3/06 |
| | | | 235/404 |
| 5,026,158 A | 6/1991 | Golubic | |
| 5,282,014 A | 1/1994 | Ruhl et al. | |
| 6,269,581 B1 | 8/2001 | Groh | |
| 7,806,331 B2 | 10/2010 | Windauer et al. | |
| 8,100,044 B1 | 1/2012 | Teetzel et al. | |
| 8,468,930 B1 * | 6/2013 | Bell | F41G 11/001 |
| | | | 342/67 |
| 2004/0025396 A1 | 2/2004 | Schlierbach et al. | |
| 2004/0088898 A1 | 5/2004 | Barrett | |
| 2007/0097351 A1 | 5/2007 | York et al. | |
| 2008/0039962 A1 | 2/2008 | McRae | |
| 2009/0165314 A1 | 7/2009 | Khoshnood | |
| 2009/0266892 A1 | 10/2009 | Windauer et al. | |
| 2011/0168777 A1 | 7/2011 | Bay | |
| 2011/0242650 A1 | 10/2011 | Windauer | |
| 2012/0097741 A1 | 4/2012 | Karcher | |
| 2012/0186131 A1 | 7/2012 | Windauer | |
| 2013/0033746 A1 | 2/2013 | Brumfield | |
| 2013/0199074 A1 | 8/2013 | Paterson et al. | |
| 2014/0124575 A1 | 5/2014 | Millett | |

FOREIGN PATENT DOCUMENTS

| | | |
|---|---|---|
| DE | 202010012352 U1 | 11/2010 |
| DE | 202011107489 U | 12/2012 |

* cited by examiner

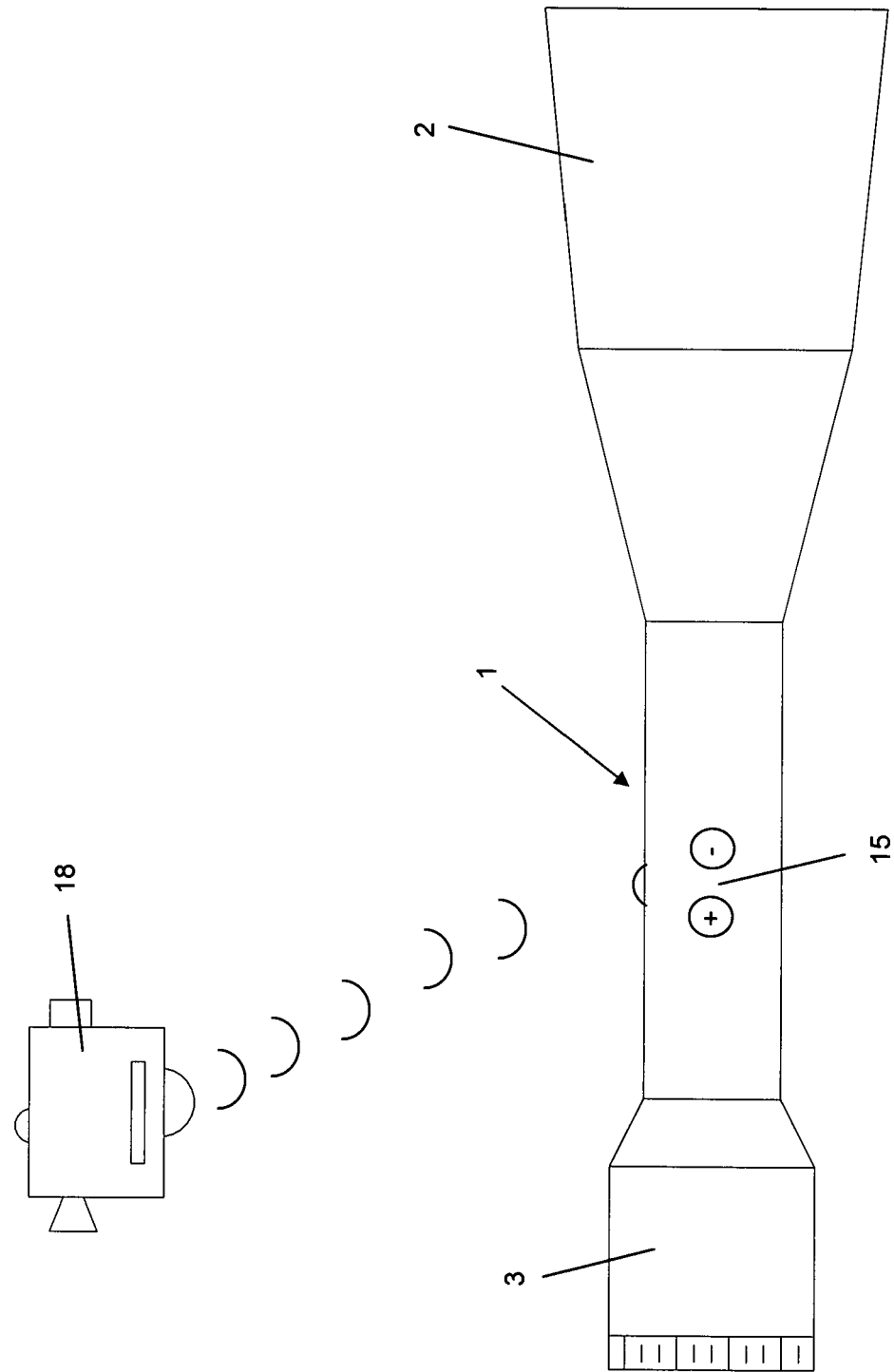

TELESCOPIC SIGHT HAVING FAST RETICLE ADJUSTMENT

CROSS-REFERENCE TO RELATED APPLICATIONS

This application is a continuation of U.S. application Ser. No. 14/904,389 filed Jan. 11, 2016, granted as U.S. Pat. No. 10,072,907; which is a U.S. national stage entry of International Application No. PCT/DE2014/000359 filed Jul. 15, 2014, which claims priority to German Patent Application No. 10 2013 012 257.0 filed Jul. 24, 2013. The contents of these applications are incorporated herein by reference in their entirety as if set forth verbatim.

DESCRIPTION

The invention relates to a long-range optical device, in particular a telescopic sight with at least one objective lens and at least one eyepiece. Between the objective lens and the eyepiece telescopic sights have an adjustable reticle, which means an aiming aid in the form of crosshairs, an illuminated cross, illuminated points and the like; coupling the reticle with what is known as a fast reticle adjustment that can be adjusted manually by the operating person is already known. The fast reticle adjustment allows the reticle to be adjusted to different shooting distances, for example 100 m, 150 m, 200 m, 250 m, 300 m etc., so that when making long shots the shooter does not have to take aim above the target, but can aim "point-blank" at the desired target with the reticle. A "point-blank" shot is fired in that, for example, the crosshairs of the reticle are aimed precisely at the point of the object that is to be shot, and the shot is then fired off in this position. Without a fast reticle adjustment, the shooter must take aim above the intended impact point, which is usually associated with an estimation and therefore with high uncertainty.

In fast reticle adjustments the height of the reticle in the optical channel of the telescopic sight is modified, and in that way adjusted for the respective distance to be shot. The adjustment is made depending on a scale that is attached to a manual operating element, usually a cap or a ring of an adjustment turret. After zeroing in the weapon and the sighting equipment with a particular type of munition, the scale is usually applied permanently to the actuating element or the actuating ring, for example being engraved. If the munition is changed, for example from a heavier bullet to a lighter bullet with an elongated trajectory, the distance information on the adjusting element of the fast reticle adjustment is no longer correct; either re-engraving is required, or an alternative marking applied in the form of an adhesive tape or the like, which can then be labeled.

Telescopic sights are also known to the prior art which have an integrated distance-measuring system, and whose reticle, in the form of electronic points, is changed depending on the measured distance. In telescopic sights of that sort with integrated laser distance measurement, the distance value is indicated by a numerical display in the field of view of the telescopic sight. The type of bullet can be retrieved from a table of a processor stored in the telescopic sight, and in that way the adjustment of the electronic reticle in the form of illuminated points positioned above one another can be adjusted to the measured distance.

Separate distance-measuring units are also known to the prior art, and are employed by the user in addition to a telescopic sight. Distance-measuring units of the known type are implemented either as monocular or as binocular telescopes, and supply an exact distance measurement to an intended target at the push of a button.

Telescopic sights with an integrated distance-measuring system are relatively voluminous and heavy, and have a not insignificant, and therefore negative, effect on the weight of a weapon. They are, furthermore, relatively delicate and expensive.

The invention/innovation is based on the object of further developing a long-range optical device in the form of a telescopic sight with the features of the preamble to claim 1 in such a way that it is easy to operate and ensures a reliable firing of hits over relatively large distances even under relatively poor light conditions. This object is achieved in that a display device is arranged in the field of view of the long-range optical device by means of which the distance value set by a setting device of the fast reticle adjustment can be read when using the long-range optical device. Advantageous developments emerge from the subsidiary claims.

As the core of the invention it is proposed that a display device is arranged in the field of view of the long-range optical device which, depending on an actuation of an input element of the fast reticle adjustment when using the telescopic sight, displays the set distance value to the user. This overcomes the disadvantage that, as dusk approaches, a shooter can often no longer read the engraved distance values on the adjusting element of the fast reticle adjustment, and thus often no longer knows accurately whether the fast reticle adjustment is now set for 150 m, 200 m or 250 m. If it is necessary to readjust the fast reticle adjustment under poor light conditions, this is often no longer possible without the assistance of a separate lamp. When hunting, however, the use of a lamp discloses to the game that a hunter is in the hide, and has the result that the game bolts from the shooting area.

In an advantageous development, the display device can be an alphanumeric display device, in particular an electronic display device controlled by a processor. With a display device of this sort it is possible to design the display in illuminated form, i.e. readable even in darkness, and for example to display at the same time other parameters such as a firing angle above or below that make a further correction of the impact point necessary. The display of the display device is made depending on a result computed by the processor, into which ballistic data of the bullet being used or of the cartridges being used can also be entered, wherein the data can be stored in the memory of the whole device. A table selection function can be used to access stored data, so that the input is relatively simple. It is also, however, possible to provide a memory apparatus in the processor, in which a correction table is stored whose correction data is linked in the processor with distance values that are entered. The correction data can be the data of a special bullet, and can supply to the processor information about what is known as the external ballistics of a bullet.

Implementing the setting device as a rotating element arranged on a turret of the long-range optical device, for example as a ring, whose rotation effects a height adjustment of the reticle, is known in principle, wherein the element interacts with an electromechanical rotation transducer that is connected to a processor input for inputting the distance value. If the ring is turned, then the display device moves upwards and downwards in the field of view, and indicates for example 175 m, whereby it is no longer necessary to provide any information in the region of the input device. This advantageously means that when a bullet is changed, access only has to be made to the new, in particular stored, electronic data relating to a new type of bullet, and a mechanical change, in particular re-engraving an input element on the adjustment turret of the fast reticle adjustment, is not necessary.

It is in principle also possible for the setting device to be designed as a button device with at least one button. When a button is pressed, the display device shows, for example, the last distance in the field of view, or starts at a distance of 100 m, and can be adjusted upwards and/or downwards from there until the appropriate distance that the user has determined to the target by means of a separate distance-measuring unit, or can estimate relatively reliably on the basis of information about the terrain, is displayed to the user.

As an alternative to a display in meters, it is also possible for a display to be made in clicks, for example as the interpretation: turn the fast reticle adjustment 6 clicks to the left, and then the exact distance is set.

The processor of the apparatus can also be connected to an electronic receiving device, for example a Bluetooth interface, which reacts to data containing distance information transmitted from a separate distance-measuring unit. If, for example, a hand-held distance-measuring unit is used which is switched on in order to determine the distance to a target, then a distance read in the distance-measuring unit (190 m, for example) is transmitted as distance information to the receiving interface of the long-range optical device that is connected to the processor. With the aid of the setting device, the distance is then tracked using the rotating adjusting element or button, until the transmitted value (190 m) agrees with the set value of 190 m. For as long as the manually set value is above the transmitted value, the readable value on the display device appears, for example, colored red, and on agreement the color changes to green, indicating to the shooter that his fast reticle adjustment is correctly set.

It is also, however, possible, for the separate distance-measuring system to result automatically in an electromechanical adjustment of the reticle in the long-range optical device, and the operating person only has to make corrections through the actuating element.

In a development of the invention it is moreover possible that, depending on a distance value set through the fast reticle adjustment or transmitted by a third party device, the nature or shape of the visible reticle is changed. At shorter shooting distances the reticle can, for example, be shown as a reticle of illuminated points, while at longer shooting distances a finer, cross-like reticle can be displayed.

BRIEF DESCRIPTION OF THE DRAWINGS

The invention is explained in more detail in terms of advantageous exemplary embodiments in the figures of the drawing. Here:

FIG. 7 shows a telescopic sight according to the invention in a third embodiment.

FIG. 1 shows a telescopic sight 1 with an objective lens 2, and eyepiece 3, an setting device in the form of a turret 4 and a first image plane 5 in which the reticle 6 is displayed according to FIG. 2.

Figure 2:
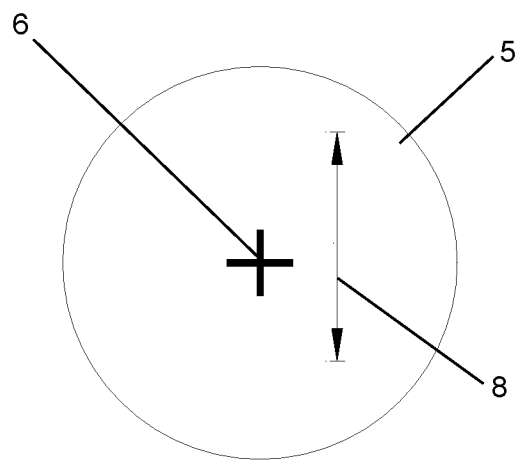
FIG. 2 shows a view of an image plane.

If the turret 4 is turned in the direction of the arrow 7, the reticle 6 is adjusted, as shown in FIG. 2, along the arrow 8, i.e. turning the turret 4 causes the height of the reticle 6 to be adjusted.

It is necessary to adjust the height of the reticle 6 for the following reasons:

The telescopic sight 1 provides a straight sighting line, whereas the bullet fired by the weapon on which the telescopic sight 1 is mounted flies along a parabolic flight path. The straight sighting line and the parabolic flight path cross at two points, wherein the second point, more remote from the shooter, is referred to as the most favorable shooting distance (GGE). A point-blank shot without height correction of the reticle 6 is thus only possible for one particular bullet and one particular distance, since the kind of bullet affects the profile of the parabolic flight path, and the sighting line and of the flight path only coincide at one point. The first crossing point can be ignored here.

It is possible through adjusting the height of the reticle 6 to change the sighting line such that the sighting line and the flight path, i.e. the second crossing point, come together at different distances. In this way it is possible to avoid the need to take aim above the target at large distances.

It is therefore known to arrange a reference marking 9 on the rotating part 19 of the turret 4 which can be turned with respect to the distance markings 10, wherein turning the rotating part 19 of the turret 4 entails an adjustment of the height of the reticle 6 in the image plane 5, which is located in the field of view of the telescopic sight 1, in the direction of the arrow 8.

Figure 1:
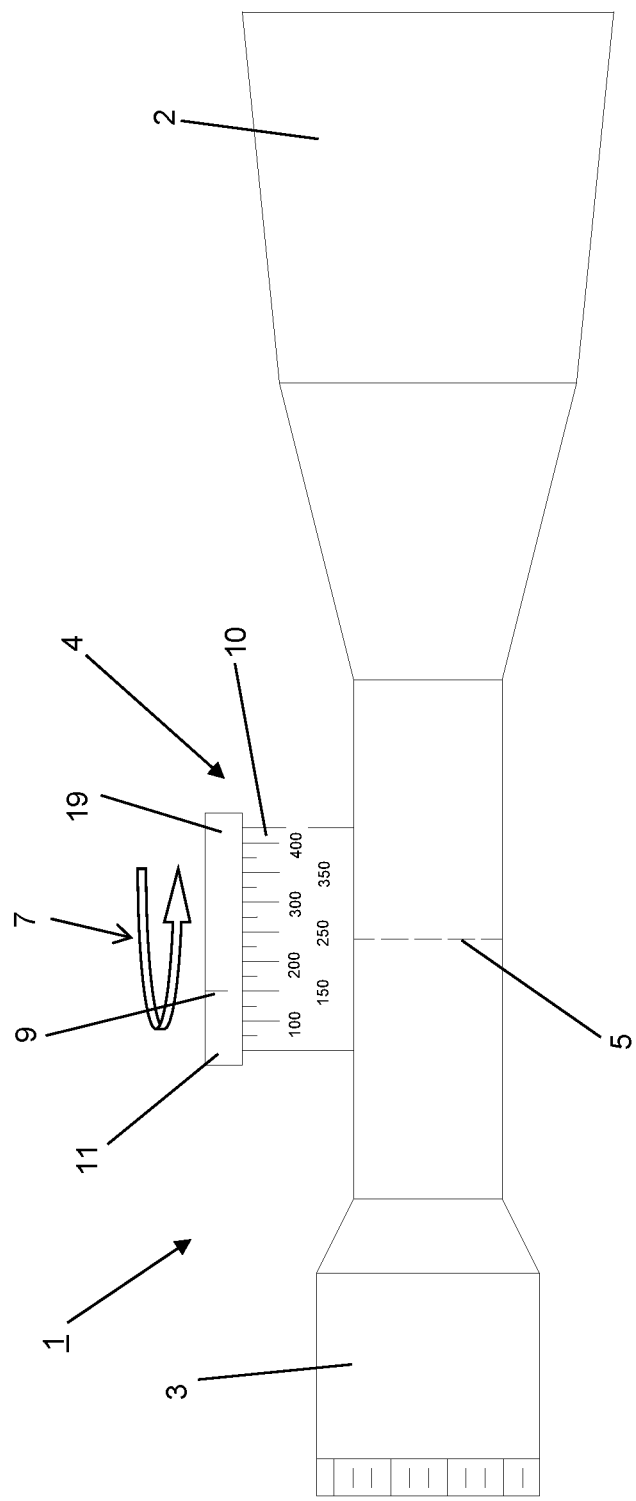
FIG. 1 shows a telescopic sight with fast reticle adjustment in a first embodiment according to the prior art.

The adjustment of the height of the reticle 6 must, however, not only be adjusted depending on the distance of the target, but also depending on the type of bullet. The distance markings shown in FIG. 1 are therefore only valid for one single type of bullet, and when a different munition is used, the arrangement of the distance markings 10 must be appropriately adjusted. The embodiment according to FIG. 1 is therefore only suitable for the use of a single type of munition or bullet, for which the distance markings have been appropriately arranged.

Figure 3:
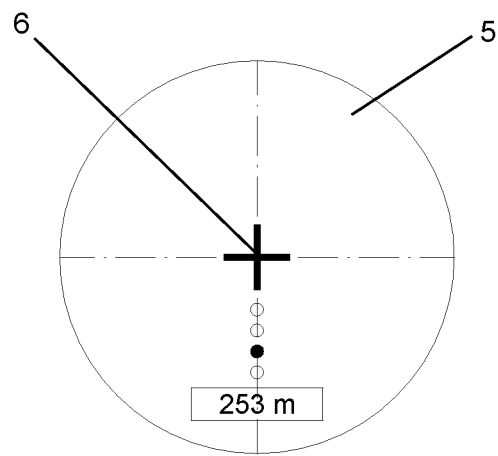
FIG. 3 shows a known display of a field of view.

FIG. 3 shows another known possibility for the display of a reticle 6. In this embodiment, a control device is coupled to a distance-measuring unit; the reticle 6 to be used is displayed illuminated depending on the distance to the target determined. A large number of aiming aids or reticles 6 are thus displayed in the image plane, and the one to be used is marked in color. In addition, the display 11 of the measured distance is found in the image plane 5, so that information about the distance to the target is additionally given to the shooter. Such implementations of the display of the image plane are known, for example, from telescopic sights of the "Ballistic Laser Scope" made by Burris.

Figure 4:
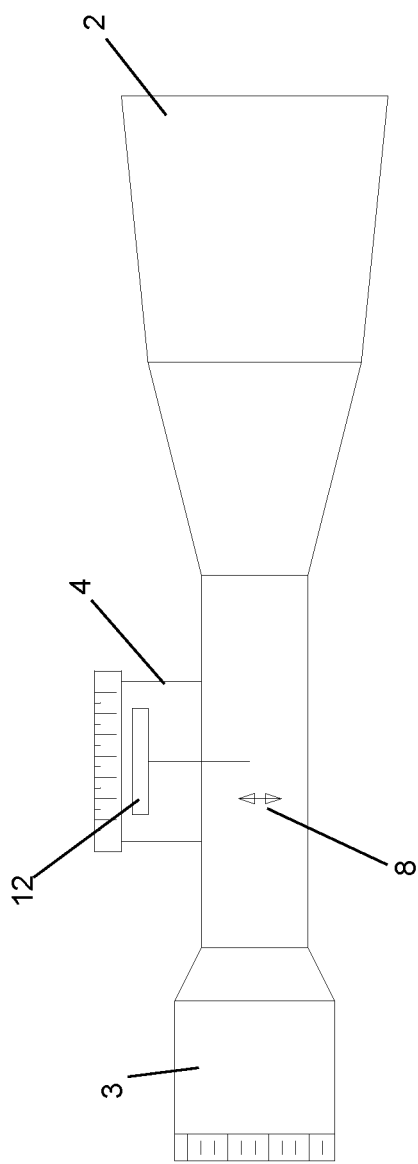
FIG. 4 shows a telescopic sight according to the invention in a first embodiment.

A telescopic sight 1 according to FIG. 4 according to the invention differs from this in that the adjustment turret 4 no longer requires any reference markings 9 or distance markings 10, but instead comprises a rotation transducer 12 for transmitting the set reference distance or the sighting line of the telescopic sight. As already described above, the crossing point of the sighting line and of the flight path of the bullet also depends on the type of bullet, for which reason the same setting of the turret 4 gives rise to crossing points at different distances for different types of bullet.

The crossing points therefore have to be converted to the munition in use on the basis of a reference munition or of a reference distance.

Figure 5:
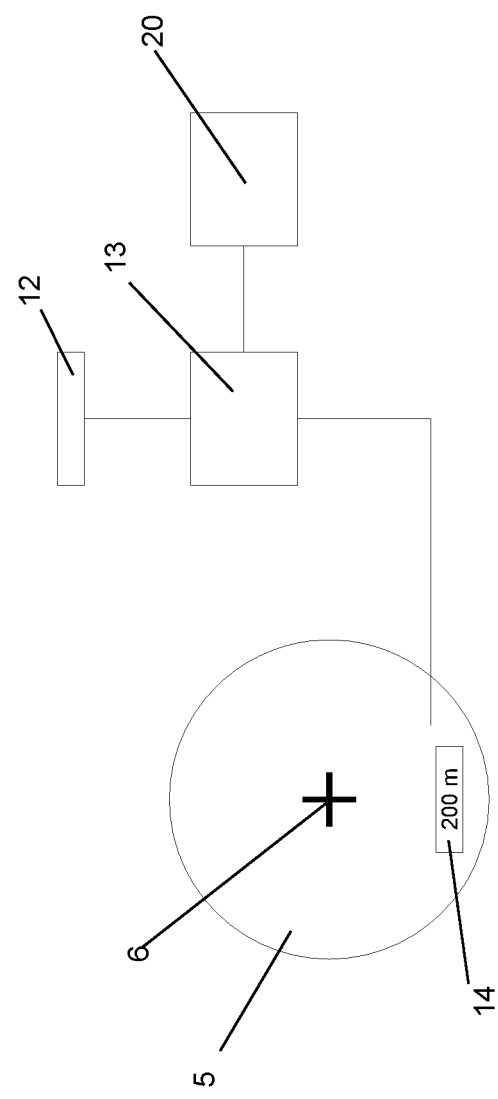
FIG. 5 shows a display of a field of view according to the invention.

FIG. 5 shows a corresponding display 5 in the first or also the second image plane, both of which are located in the field of view of the telescopic sight 1. On the basis of the signal from the rotation transducer 12, a control device 13 in the form of a processor calculates, depending on the type of bullet that is entered or the current type of bullet, the distance at which the sighting line and the flight path of the bullet cross, i.e. the most favorable shooting distance, depending on the rotation setting of the turret 4 and of the munition being shot. The control device 13 accesses the data stored in the memory apparatus 20 for this purpose. On the basis of this information, the control device 13 calculates the distance value set at the turret 4, which is displayed on the display device 14. In contrast to the known prior art, the display device 14 therefore does not display the measured distance to the target, but the distance set at the turret 4, and, in association with this, the most favorable shooting distance which, however, is initially fully independent of the location of the target that is intended or is to be intended. The shooter has information about the setting of the turret 4 for this purpose at all times.

It is, here, normally the case that a hunter or other shooter does not continuously change the type of munition, but usually makes use of a standard munition. Once this standard munition has been chosen, the display device 14 displays the most favorable shooting distance for the munition being used. This depends, of course, on the rotary setting of the turret 4, and therefore on the height adjustment of the reticle 6.

Figure 6:
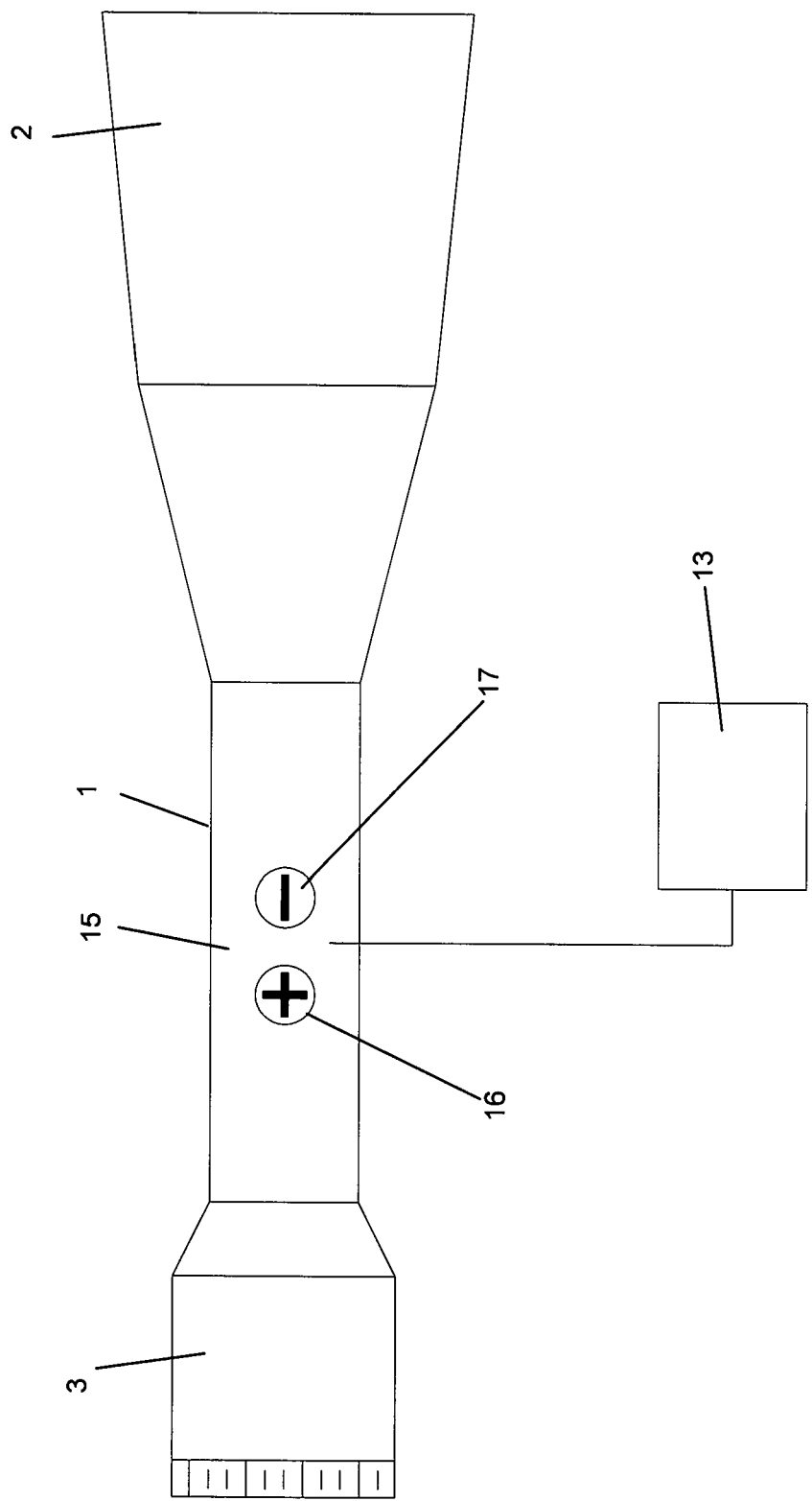
FIG. 6 shows a telescopic sight according to the invention in a second embodiment.

FIG. 6 shows a further embodiment of a telescopic sight 1 according to the invention, in which the setting device is implemented as a button device 15 with two buttons 16 and 17. Adjusting the height of the reticle 6 is done depending on actuation of the buttons 16 and 17, wherein a marking of the button 16 with a "+" character, and the button 17 with a "−" character is to be understood to mean that by pressing the button 16 the most favorable shooting distance is increased, and that by pressing the button 17 a corresponding reduction takes place, wherein by pressing the button 16 the reticle 6 is lowered. A reticle 6 in a lower position namely has the effect of shifting the sighting line, and thus of causing the shooter to raise the weapon that is connected to the telescopic sight 1.

The adjustment of the height of the reticle 6 is done depending on actuation of the buttons 16 and 17 mechanically or electrically, wherein setting pulses for determining the distance value depending on actuation of the buttons 16 and 17 are passed to the input of the control device 13.

Instead of two buttons 16 and 17, the button device 15 may also be fitted with a rocker switch, a rotary control knob or any other switch design that allows signals to be transmitted of such a type that the setting value is raised and lowered again. In contrast to the turret 4 described above, the rotary control knob has a latching centre position to which the switch is also returned, and wherein the rotary control knob can be turned from this central position in a clockwise or anticlockwise direction, so that a reduction or increase in the distance value can be transmitted as a signal.

FIG. 7 shows a further embodiment of the telescopic sight 1 according to the invention, in which a distance-measuring unit 18 can be connected to the telescopic sight 1, in particular by means of a Bluetooth connection. The distance-measuring unit 18, which preferably operates on a laser basis, transmits the measured target distance as a signal to the telescopic sight 1 or to a reception unit of the control device 13. The target distance determined by the distance-measuring unit can be utilized in several ways.

In a first embodiment, the distance value displayed in the display device 14 can be displayed in a first color, green for example, when the target distance determined by the distance-measuring unit 18 differs from the displayed and set distance value by no more than a predetermined threshold value. If the distance value is above or below the target distance by the predetermined threshold value, the distance value is displayed in a second color, red for example. In order to make it easier for the shooter to perform the correction of the distance value, i.e. the adjustment of the setting device, either of the turret 4 or of the button device 15, information regarding the target distance is to be given to the shooter. In the simplest case, the measured target distance is displayed in addition to the distance value on the display device 14. Instead, however, triangles can also be used in order to indicate that the distance value needs to be set higher or lower. A triangle on a side line and with its point upwards here indicates an increase in the distance value, and a triangle standing on its head with the point downwards indicates a reduction.

In another embodiment, only the distance value is displayed, wherein when the target distance is exceeded a second color is used in order to display the distance value, and a third color when below the target distance. This means, for example, that when the distance value is displayed in blue, the distance value is to be reduced, and when the distance value is displayed in yellow the distance value is to be increased.

Other color schemes can, of course, be chosen here; what is crucial is that when a predetermined threshold value is infringed, exceeding or falling below the threshold value is demonstrated using different colors.

The threshold value when exceeding and when falling below can, furthermore, be different; for example it is possible to specify that it is only permitted to fall below the target distance determined by 5 m, but it may be exceeded by 10 m before the distance value is displayed in colors that indicate the need for a correction. What is crucial in this exemplary embodiment again, is that the distance value illustrated is correlated to the set value of the setting device, and not with the target distance measured.

LIST OF REFERENCES

1 Telescopic sight
2 Objective lens
3 Eyepiece
4 Turret
5 Image plane
6 Reticle
7 Arrow
8 Arrow
9 Reference marking
10 Distance marking
11 Display of the measured distance
12 Rotation transducer
13 Control device
14 Display device
15 Button device
16 Button
17 Button
18 Distance-measuring unit
19 Rotating part
20 Memory

The invention claimed is:

1. A method of operating a long-range optical device (1) including an electronic display device (14), comprising
executing instructions contained within a computer readable memory (20) on a processor to optically display in the electronic display device (14) an agreement or a disagreement between a first distance value to a target obtained from adjusting a reticle and a second distance value to the target obtained from a separate distance-measuring unit, wherein the executing instructions includes:
determining a difference between the first distance value and the second distance value and optically displaying the difference in the electronic display device (14);
wherein the difference is displayed as an agreement between the first distance value and the second distance value when the difference lies within a predetermined threshold value; and
wherein the difference is displayed as a disagreement between the first distance value and the second distance value when the difference lies outside the predetermined threshold value.

2. The method of claim 1, further comprising repetitively redetermining the difference between the first distance value and the second distance value upon operation of a setting device (4, 15) of the reticle, and optically displaying the redetermined difference in the electronic display device (14).

3. The method of claim 2, wherein the setting device (4, 15) is implemented as a rotating element (19) arranged on a turret (4) of the long-range optical device, whose rotation effects a height adjustment of the reticle (6), wherein the element (19) interacts with an electromechanical rotation transducer (12) that is connected to a processor input for inputting the distance value.

4. The method of claim 3, wherein the rotating element (19) is mechanically coupled to the reticle (6) for adjusting its height.

5. The method of claim 2, wherein the setting device (4, 15) is implemented as a button device (15) with at least one button (16, 17), the height adjustment of the reticle (6) is made depending on actuation of the buttons (16, 17) mechanically or using a motor, and setting pulses for input of the distance value are passed to a processor input depending on an actuation of the buttons (16, 17).

6. The method of claim 1, wherein the display device (14) is an alphanumeric display device.

7. The method of claim 1, wherein the computer readable memory (20) comprises ballistic data of at least one bullet or one cartridge which is linked in the processor (13) with the first distance value.

8. The method of claim 1, wherein the computer readable memory (20) comprises a correction table comprising correction data, which correction data is linked in the processor (13) with the first distance value.

9. The method of claim 1, wherein the optical display of an agreement or a disagreement is made through a change in the color viewable in the display device (14), wherein an agreement is represented by a first color and a disagreement is represented by a second color.

10. The method of claim 1, wherein the optical display of an agreement or a disagreement is made through a separate display element.

11. The method of claim 1, wherein an electromechanical adjustment of the reticle (6) is made immediately through the distance values of the separate distance-measuring unit (18) received through data transmission.

12. The method of claim 1, wherein a display or shape of the reticle (6) is changed depending on the distance that is manually set or that is set by data transmission.

13. The method of claim 1, wherein at shorter shooting distances, the reticle (6) can be displayed as a point-reticle, and at longer shooting distances the reticle can be displayed as a cross-like reticle.

14. The method of claim 1, wherein the processor (13) is connected to a correction input device, through which predetermined fast reticle adjustment values can be corrected.

15. The method of claim 14, wherein the correction input device comprises at least one input button.

16. The method of claim 1, the display device (14) or the reticle is arranged in a first or a second image plane.

17. The method of claim 1, wherein the display device (14) or the reticle is arranged on an OLED display.

* * * * *